United States Patent [19]

Raffoni

[11] Patent Number: 5,336,038
[45] Date of Patent: Aug. 9, 1994

[54] LAMINAR STAPLE FOR ANGULARLY JOINING PROFILED STRIPS

[75] Inventor: Giuseppe Raffoni, Forli, Italy
[73] Assignee: Alfamacchine Di Raffoni Giuseppe, Forli, Italy
[21] Appl. No.: 119,298
[22] Filed: Sep. 13, 1993

[30] Foreign Application Priority Data

Sep. 25, 1992 [IT] Italy .................. 000190/92[U]

[51] Int. Cl.⁵ ............................................. F16B 15/00
[52] U.S. Cl. ........................ 411/478; 411/499; 411/912
[58] Field of Search .......... 411/464, 477, 478, 488, 411/489, 496, 499, 912

[56] References Cited

U.S. PATENT DOCUMENTS

| | | |
|---|---|---|
| 2,782,673 | 2/1957 | Packard . |
| 4,681,498 | 7/1987 | Raffoni ................ 411/478 X |
| 5,193,959 | 3/1993 | Motta ................ 411/478 |

FOREIGN PATENT DOCUMENTS

| | | |
|---|---|---|
| 534735 | 3/1984 | Australia . |
| 8606071 | 6/1986 | Fed. Rep. of Germany . |
| 2311210 | 12/1976 | France . |
| 2383348 | 10/1978 | France . |
| 2525949 | 11/1983 | France . |
| 2629151 | 9/1989 | France ................ 411/477 |
| 413984 | 7/1934 | United Kingdom ........ 411/477 |

*Primary Examiner*—Neill R. Wilson
*Attorney, Agent, or Firm*—Guido Modiano; Albert Josif; Daniel O'Byrne

[57] ABSTRACT

Laminar staple including two walls which are substantially at right angles to each other and which form an edge and two ribs which extend substantially at right angles to the walls; the walls and the ribs form a cutting edge, and the ribs have two planar portions substantially parallel to the edge which progressively diverge proximate to the cutting edge into circular arc portions.

4 Claims, 3 Drawing Sheets

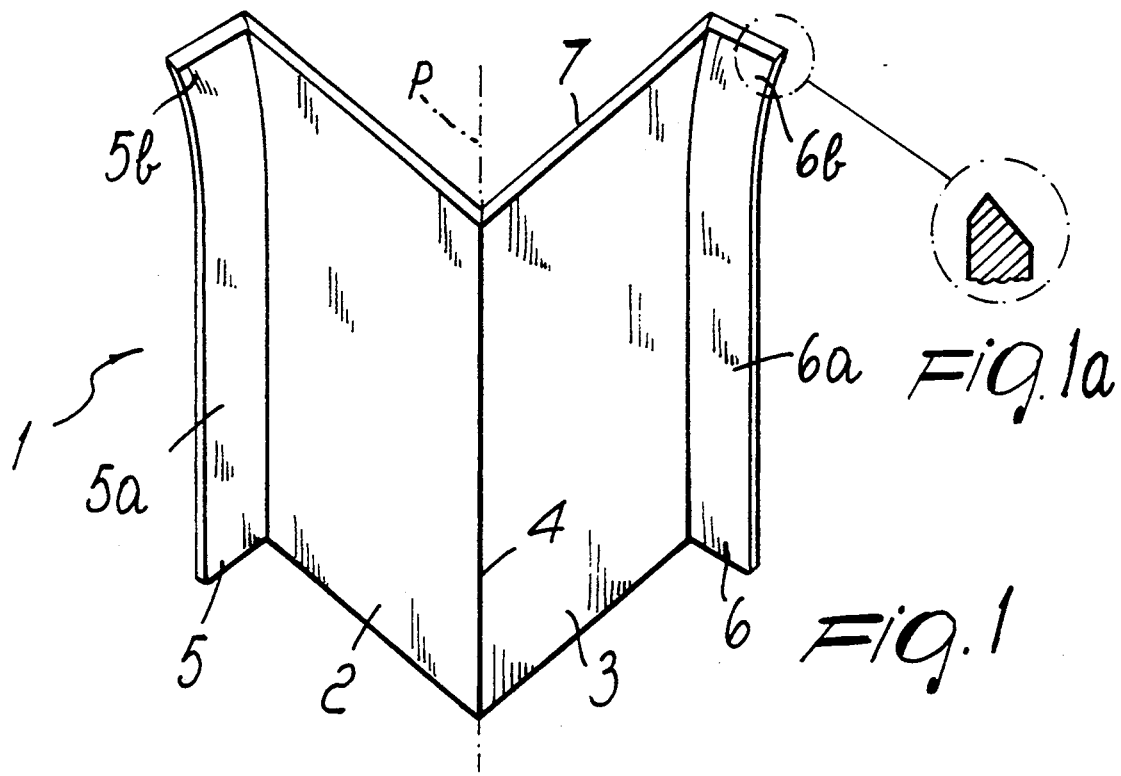
Fig. 1a
Fig. 1
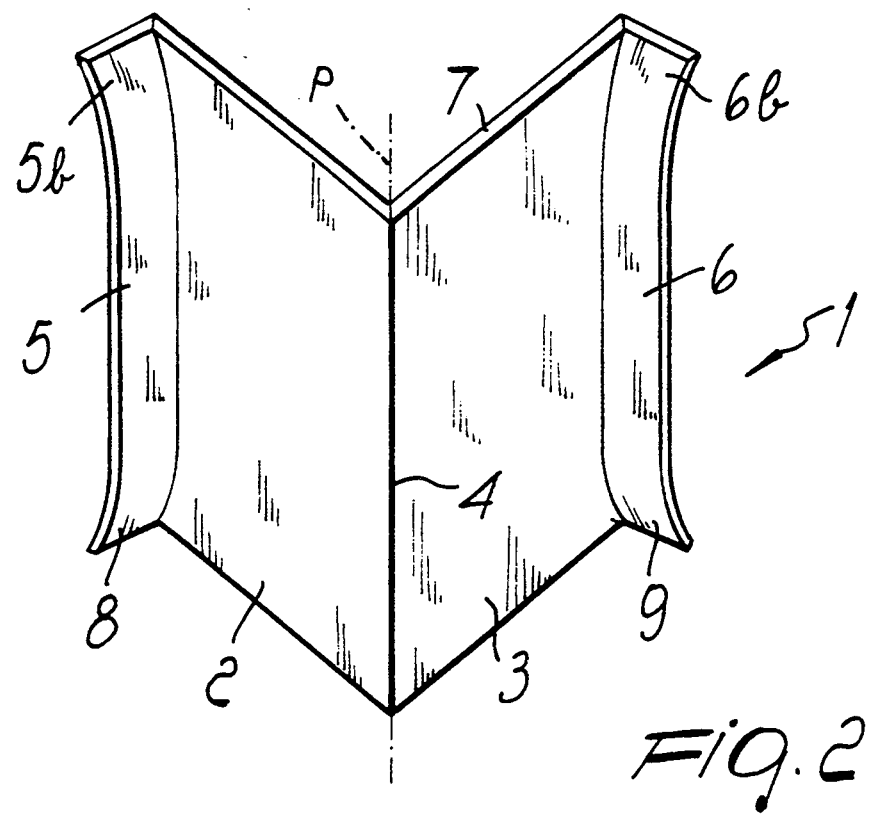
Fig. 2

LAMINAR STAPLE FOR ANGULARLY JOINING PROFILED STRIPS

BACKGROUND OF THE INVENTION

The present invention relates to a laminar staple for joining profiled strips at an angle, particularly for manufacturing frames, frameworks and the like.

In the manufacture of picture frames or of similar wood frameworks, it is known to join strips at an angle by resorting to laminar staples inserted astride the joining plane formed by the contact of the appropriately chamfered ends of the strips. Staples of this type are disclosed in U.S. Pat. No. 1,959,360, in French patents no. 877,266 and no. 2,318,715, in Italian patent no. 1,041,695, in British patent no. 1,165,482 and in German patents no. 2,102,501 and 1,400,848.

Laminar staples are also commercially available which comprise a steel lamina folded so as to form two mutually perpendicular walls and two edge ribs or ridges which are at right angles to said walls and extend outwards, so that the staple assumes a substantially W-shaped profile. Staples of this type are disclosed in U.S. Pat. No. 29,957 and in French patent no. 2,318,715.

In order to mutually join two profiled strips, for example cut at an angle of 45° in order to arrange them at right angles, said W-shaped staples are inserted astride the joining plane formed by the mutual contact of the strips, so that the edge formed by the perpendicular walls and laying at the centerline plane of the staple is at the joint.

In order to facilitate insertion, one of the borders with a W-shaped profile of the staples has a cutting edge.

Problems have been observed with these staples in keeping the strips in contact at the joining plane due to non-uniformities in their cutting and in particular to their expansion caused by the insertion of the staples.

In order to obviate this drawback, U.S. Pat. No. 4,681,498 proposed a contoured staple, but the result was positive only in the case of natural wood strips. In the case of wood pulp strips, instead, mutual contact of the strips resumes only at the upper part of the joint, whereas the lower part, which has expanded due to the insertion of the staples, remains partially open.

SUMMARY OF THE INVENTION

A principal aim of the present invention is to provide a laminar staple which is a further improvement on known ones.

Within the scope of this aim, another aim of the present invention is to provide a laminar staple usable on wood strips of different kinds, and in particular on strips made of wood pulp, or of plastics, in which there is no fiber direction.

With these and other aims in view, there is provided, according to the present invention, a laminar staple comprising two walls which are substantially at right angles to each other and which form an edge and two ribs extending substantially at right angles to said walls, said walls and said ribs forming a cutting edge, characterized in that said ribs have two portions substantially parallel to said edge which progressively diverge proximate to the cutting edge.

Tests conducted have shown that with a laminar staple shaped in this manner, the expansion of the strips due to staple insertion is substantially limited.

BRIEF DESCRIPTION OF THE DRAWINGS

Further characteristics and advantages of the present invention will become apparent from the following detailed description of two preferred embodiments thereof, together with the accompanying drawings, wherein:

FIG. 1 is a perspective view of a staple according to a first embodiment of the invention;

FIG. 1a is an enlarged sectional detail view of a cutting edge of the staple of FIG. 1;

FIG. 2 is a perspective view of a staple according to another embodiment of the invention;

DESCRIPTION OF THE PREFERRED EMBODIMENTS

Figure 3:
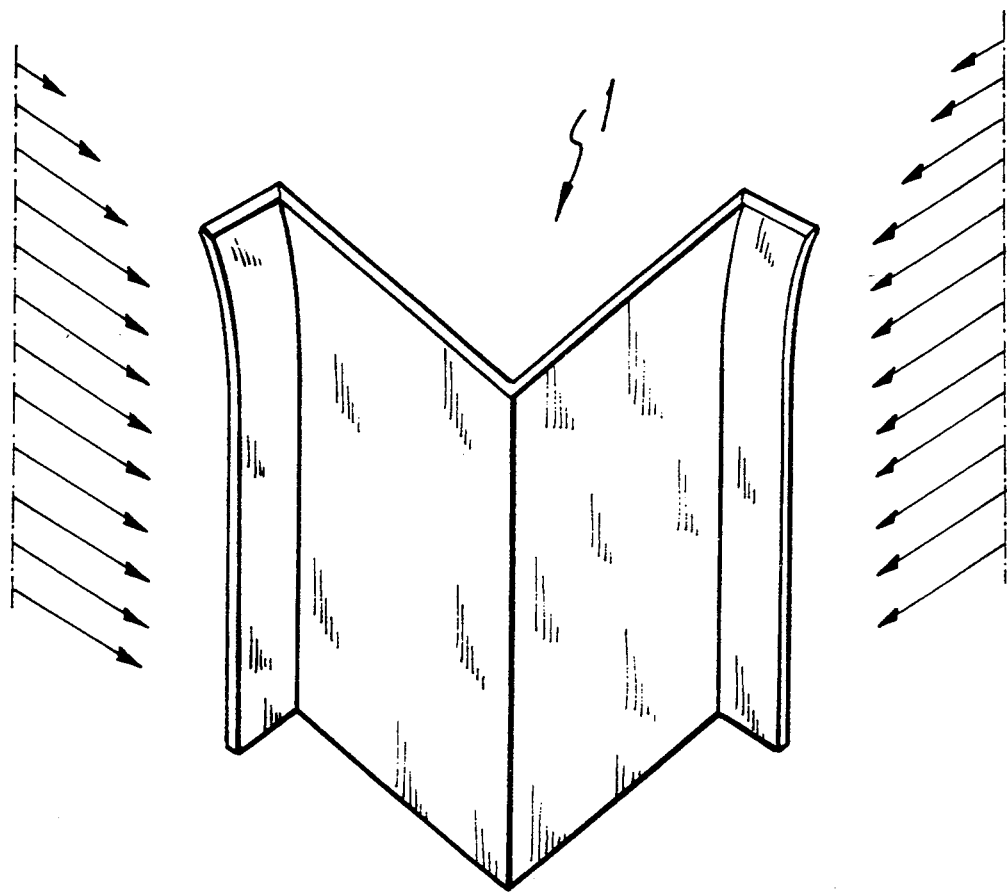
FIG. 3 illustrates the distribution of the strip locking forces applied by the staple at a joint.

In FIG. 1, the staple, generally designated by the reference numeral 1, comprises a rectangular steel lamina which is folded in half along its centerline plane P so as to form two walls 2 and 3 which are substantially mutually perpendicular and form an edge 4. The end portions of the walls 2 and 3 are in turn folded at right angles to the walls, so as to form two ribs 5 and 6 which extend outwards with respect to the right angle delimited by the walls 2 and 3 and give the staple a W-shaped profile.

The staple insertion border has a cutting edge 7 formed by means of a lateral or bilateral chamfer.

The ribs 5 and 6 comprise two respective planar portions 5a, 6a which are substantially parallel to the edge 4 for most of the height of the staple; said portions diverge proximate to the cutting edge 7 with respect to the centerline plane P, thus forming two circular arc portions 5b, 6b.

As can be seen, the described invention optimally achieves the intended aim and objects. In fact, during the insertion of the staple astride the joint, the locking force produced is markedly more effective than that obtainable with current staples and is located at the median region of the strips (see FIG. 3), ensuring perfect closure of the joint both on the upper side and on the lower side.

Numerous modifications and variations are possible in the practical embodiment of the present invention, and all are within the scope of the innovative concept.

In particular, the extension of the planar and arclike portions of the ribs is chosen according to the shape of the cross-section of the strips. The bilateral chamfer of the cutting edge may be asymmetrical, with a narrower face on the outside of the right angle formed by the walls and 3, in order to avoid excessive rib widening.

Figure 4:
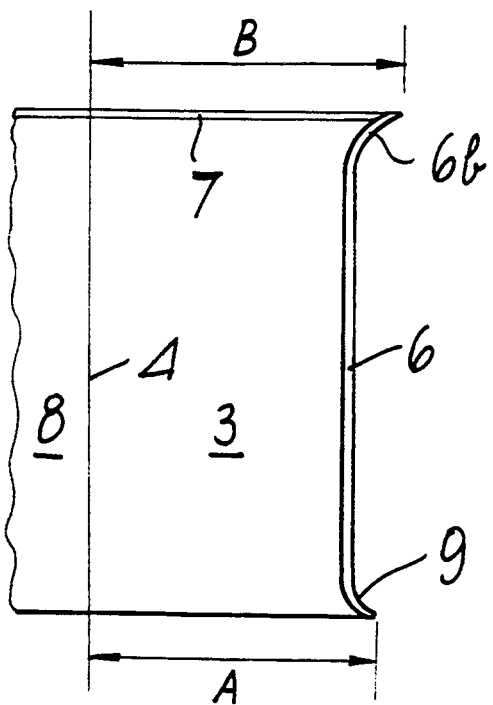
FIG. 4 is a schematic elevational view of the staple according to a further embodiment of the invention.

In the embodiment of FIG. 2, the ribs 5 and 6 have diverging portions or wings 8 and 9 on the side of the staple which is opposite to the cutting edge. The ends of the wings 8 and 9 and of the portions 5b, 6b have the same distance from the edge 4. As shown in FIG. 4, the distances A, defined between the ends of the wings 8 and 9 and the edge 4 may be slightly smaller than the distance B, defined between the ends of the portions 5b, 6b and said edge 4. These wings allow to keep the staple aligned in the channel for the ejection of the tool by means of which it is inserted in the part, avoiding, at the same time, the possibility of stacking of the staples.

I claim:

1. Laminar staple comprising two walls which are substantially at right angles to each other and which form an edge and two ribs extending substantially at right angles to said walls, said walls and said ribs forming a cutting edge,
   wherein said ribs have two portions substantially parallel to said edge which progressively diverge proximate to the cutting edge, and
   wherein said portions diverge so as to form circular arc portions.

2. Laminar staple according to claim 1, wherein said ribs, at the ends opposite to the diverging ones, have wings or expanded portions having from the edge the same distance as said diverging ends.

3. Laminar staple according to claim 1, wherein said ribs have, at the ends opposite to the diverging ones, wings or expanded portions having from the edge a smaller distance than said diverging ends.

4. Laminar staple according to claim 1, wherein said cutting edge is formed by an asymmetrical bilateral chamfer.

* * * * *